United States Patent [19]

Schmidt et al.

[11] 4,272,829

[45] Jun. 9, 1981

[54] RECONFIGURABLE REGISTER AND LOGIC CIRCUITRY DEVICE FOR SELECTIVE CONNECTION TO EXTERNAL BUSES

[75] Inventors: Carson T. Schmidt, San Diego; William P. Ward, Poway; Rocky M. Y. Young, San Diego, all of Calif.

[73] Assignee: NCR Corporation, Dayton, Ohio

[21] Appl. No.: 865,457

[22] Filed: Dec. 29, 1977

[51] Int. Cl.³ .................................................. G06F 13/00
[52] U.S. Cl. ..................................... 364/900; 307/241
[58] Field of Search ... 364/200 MS File, 900 MS File; 307/241, 242, 243, 221 R; 328/37, 152, 153, 154

[56] References Cited

U.S. PATENT DOCUMENTS

| | | | |
|---|---|---|---|
| 3,311,889 | 3/1967 | Birmingham et al. | 364/200 |
| 3,460,098 | 8/1969 | De Blauw | 364/900 |
| 3,602,889 | 8/1971 | Gayman et al. | 364/200 |
| 3,614,740 | 10/1971 | Delagi et al. | 364/200 |
| 3,651,472 | 3/1972 | Holtey | 364/200 |
| 3,737,866 | 6/1973 | Gruner | 364/200 |
| 3,748,649 | 7/1973 | McEowen et al. | 364/200 |
| 3,793,631 | 2/1974 | Silverstein et al. | 364/200 |
| 3,820,084 | 6/1974 | Jones et al. | 364/200 |
| 3,833,889 | 9/1974 | Cray | 364/200 |
| 3,916,383 | 10/1975 | Malcolm | 364/200 |
| 3,939,455 | 2/1976 | Toyosawa | 364/200 |
| 3,940,743 | 2/1976 | Fitzgerald | 364/200 |
| 3,943,494 | 3/1976 | Holmes, Jr. et al. | 364/200 |
| 3,943,495 | 3/1976 | Garlic | 364/200 |
| 3,984,670 | 10/1976 | Erickson et al. | 364/200 |
| 4,016,547 | 4/1977 | Page | 364/900 |
| 4,020,472 | 4/1977 | Bennett et al. | 364/200 |
| 4,024,509 | 5/1977 | Elmer | 364/900 |
| 4,030,076 | 6/1977 | Blum et al. | 364/200 |
| 4,071,890 | 1/1978 | Pandeya | 364/200 |
| 4,079,452 | 3/1978 | Larson et al. | 364/200 |
| 4,079,455 | 3/1978 | Ozga | 364/200 |
| 4,080,659 | 3/1978 | Francini | 364/200 |
| 4,125,869 | 11/1978 | Gutmann | 364/900 |
| 4,158,235 | 6/1979 | Call et al. | 364/900 |

OTHER PUBLICATIONS

Raytheon Digital, Total Low-Power Schottky 9LS/25LS/54LS/74LS, pp. 3-10-3-17 and 3-83-3-85, Jul. 1977.

Primary Examiner—Melvin B. Chapnick
Attorney, Agent, or Firm—J. T. Cavender; Edward Dugas; Stephen F. Jewett

[57] ABSTRACT

A register circuit capable of use in various components of a computer. The register circuit includes two registers and logic circuitry that enables plural data buses to be selectively connected in various configurations to the data inputs and outputs of the registers. In an embodiment showing the register circuit constructed using emitter coupled logic, a clocking circuit generates clocking signals for selecting the data buses to be connected to the input of each register. Each register comprises plural master-slave flip-flops which receive the clocking signals from the clocking circuit and operatively connect the flip-flops to the selected bus or buses in response to such signals.

8 Claims, 10 Drawing Figures

RECONFIGURABLE REGISTER AND LOGIC CIRCUITRY DEVICE FOR SELECTIVE CONNECTION TO EXTERNAL BUSES

BACKGROUND OF THE INVENTION

The present invention relates to short term data storage devices, such as registers, and relates in particular to a register circuit which can be used in various components of a computer.

In a typical computer system, registers are used in many different locations to temporarily store data signals as such signals are transferred along data buses. In some locations, registers may have only a single input data bus and a single output data bus for transferring data into and out of the register. In other locations, registers may have three or more data input and output buses. In such instances, data going into the register from plural buses may be combined by logic gates prior to being stored in the register, or, the register may actually comprise plural registers with each register receiving data from and conveying data to a different data bus.

In the past, where the desired register circuits are constructed on a single integrated circuit chip, it has been common to design a different chip for each location in the computer system where a register must be connected in a particular or unique fashion to input and output buses. As a result, in some computer systems, it is necessary to design and construct as many as 100 or more different chip designs or "part types" having registers. When there are so many different part types in a computer system, the opportunity for a design or production error to occur is very great. This has led to considerable expense in the manufacture of computers.

SUMMARY OF THE INVENTION

A data storage circuit in accordance with the present invention includes data storage means and logic gate means for operatively connecting plural data buses to the data storage means in any one of many selectable modes. In one embodiment of the present invention there is disclosed a "register circuit", that is, a circuit that includes at least one or more registers for storing or holding data. The register circuit further includes logic gates for operatively connecting plural data buses to the data inputs and outputs of the registers. Write and read control signals to the logic gates control the mode in which the data buses are connected to the registers.

In a second disclosed embodiment of the invention, the write control signals are delivered to a clocking circuit which, in response to the write control signals and an external clock, generates clocking signals. The registers in such embodiment are comprised of plural master-slave flip-flops. The flip-flops accept data from one or more buses in response to such clocking signals.

The entire register circuit in either of the disclosed embodiments can be constructed on a single integrated circuit chip.

One significant advantage of a register circuit constructed as disclosed herein is its versatility. Only a single chip design is required and such design can replace the 100 or more different chip designs or part types which previously would have been used in a single computer. Since only one chip design is required, and is capable of performing any of the functions previously accomplished by many part types, the likelihood of a design error or of a production error is considerably reduced. Much of the high cost associated with designing and producing many part types or with constructing each register circuit from discrete components is eliminated.

It is therefore an object of the present invention to provide an improved data storage circuit for use in a computer system.

It is a further object of the present invention to provide a register circuit capable of performing any one of many different functions commonly performed by differently designed register circuits in the past.

It is still a further object of the present invention to provide a register circuit usable in various components of a computer and which requires only a single design and production effort.

DESCRIPTION OF THE PREFERRED EMBODIMENT

Figure 1:
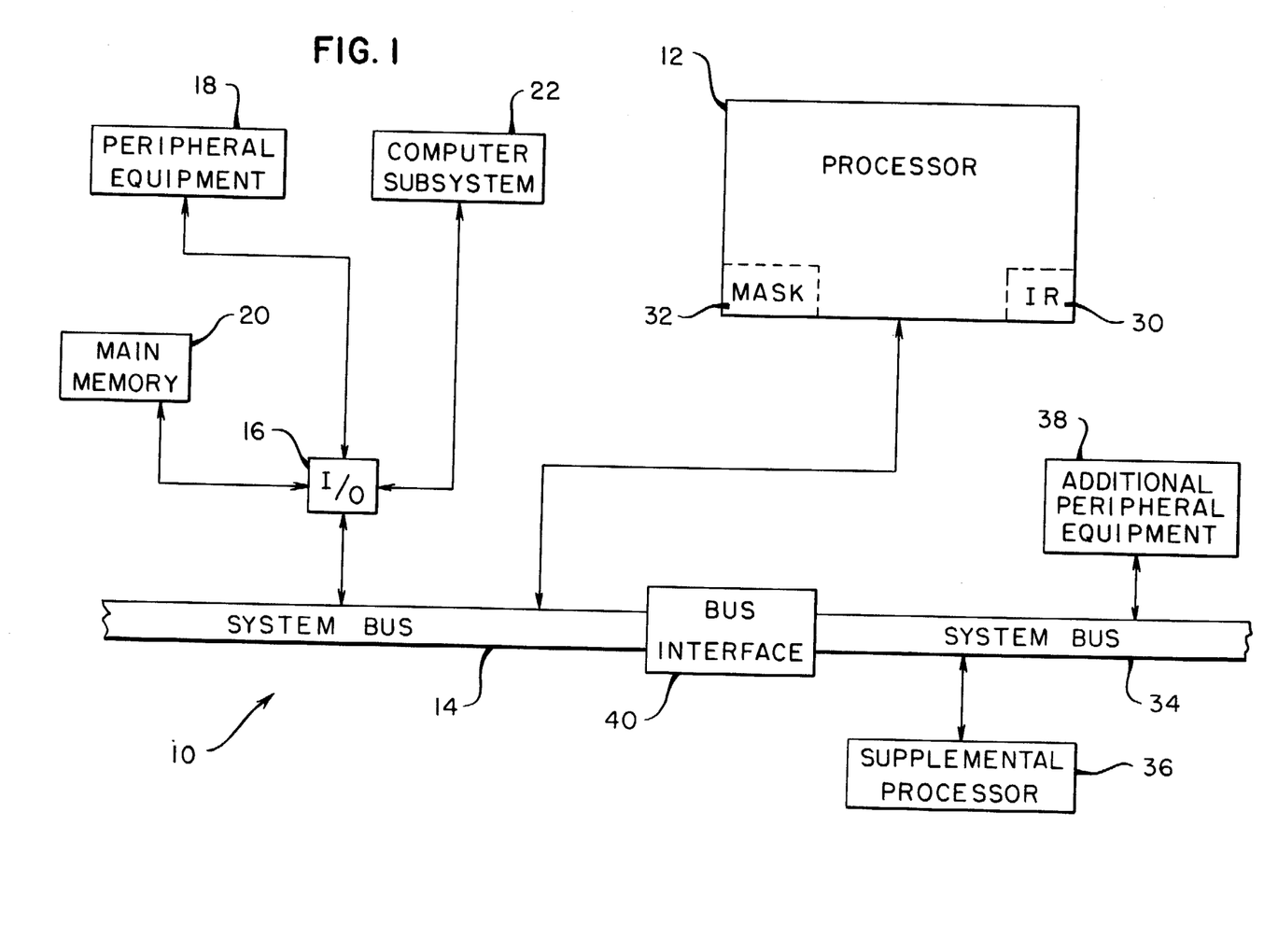
FIG. 1 is a block diagram showing a computer system and illustrating the various locations in the system where a register circuit in accordance with the present invention may be utilized.

Referring to FIG. 1, a typical computer system 10 is illustrated having a processor 12 and a primary system bus 14 which, by way of an input/output (I/O) device 16, connects the processor to peripheral equipment 18, a main memory 20, and a computer subsystem 22. The peripheral equipment 18 may be comprised of data input or display devices, such as keyboards, punched card readers, CRT displays, printers and the like. The memory 20 may be any conventional memory device, such as a magnetic disk or drum, or a semiconductor memory device. The computer subsystem 22 could be a "sub-computer", having its own processor, memory, and peripheral equipment.

As illustrated in FIG. 1, the processor 12 may include an instruction register (IR) 30 and a mask 32. Although not illustrated, the processor 12 would further include control registers, a control store, a scratch pad memory and an arithmetic and logic unit (ALU), as well as other conventional components for selecting micro-code or micro-instructions from the control store and after temporarily storing them in the instruction register, using the micro-code to request, transfer, and otherwise cause the ALU to operate on data stored within the processor's scratch pad memory or recalled from the computer main memory 20. The mask 32 assists in operations carried on by the ALU, for example, by inserting logical "0's" in certain digits of the data.

The computer system 10 may further include a second system bus 34 which may connect a supplemental processor 36 to additional peripheral equipment 38. The second system bus 34 is interfaced with system bus 14 by a bus interface circuit 40.

The computer system 10 as thus far described is entirely conventional, and such a system has been described both generally and specifically in a wealth of prior publications and patents, including, for example, Buchwald, Steven, *Microcode Increases Minicomputer Processing Capability*. P. 91–99, Computer Design (October, 1977), and Gochwind, Hans W., *Design of Digital Computers*. P. 246–247, 338–330. New York; Springer-Verlay (1967).

The I/O device 16, the mask 32, the IR 30, and the bus interface 40 are all components or devices within the computer 10 which may use a register or plural registers connected in various configurations to data buses or lines. In addition to these four devices, in a typical computer such as the computer 10, there may be 100 or more other devices which use a register or registers. In each of the four illustrated devices, as well as the many other possible devices using registers, it has been the general practice in the past to individually design and construct the registers and the bus connections to the registers. FIGS. 2A, 2B, 2C and 2D illustrate the registers and the connection of buses to the registers that one would find in the I/O device 16, IR 30, mask 32, and bus interface circuit 40.

Figure 2A:
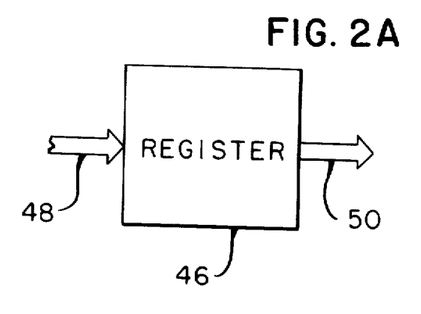
FIGS. 2A, 2B, 2C and 2D are simplified block diagrams illustrating the registers used in the system of FIG. 1, and their connection to input and output buses.

In FIG. 2A, a simple register 46 is shown having a data input bus 48 and a data output bus 50. This simple register and bus configuration could be used in the IR 30.

Figure 2B:
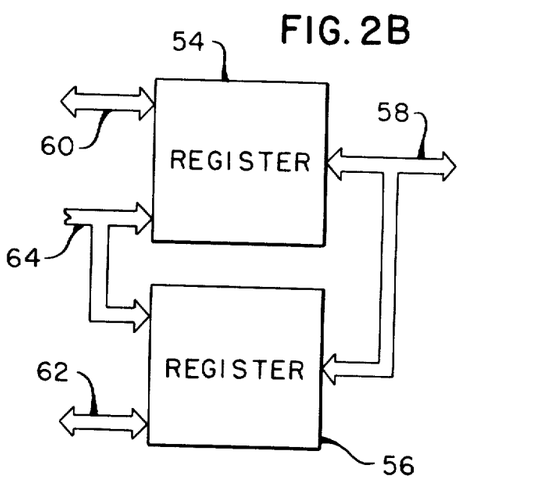

In FIG. 2B, two registers 54 and 55 are illustrated. On the right-hand side of the registers 54 and 56 is a single bi-directional data bus 58, for transferring data into or out of the registers, and on the left-hand side of the registers are a bi-directional data bus 60 for transferring data into or out of the register 54, a bi-directional bus 62 for transferring data into or out of register 56, and a single directional bus 64 feeding into both registers 54 and 56. Although not specifically illustrated, any one of the bi-directional buses 58, 60 and 62 could be selectively connected to either the data input or output of a register by conventional gating circuitry. The registers and bus configuration shown in FIG. 2B are illustrative of what could be found in I/O device 16 of FIG. 1. Bus 58 could be connected to the primary system bus 14, and buses 60 and 62 could be connected to main memory 20 and subsystem 22. The single direction bus 64 could be connected to a device in the peripheral equipment 18 which would transmit data to, but not receive data from, the registers. An example of such a device might be a card reader.

Figure 2C:
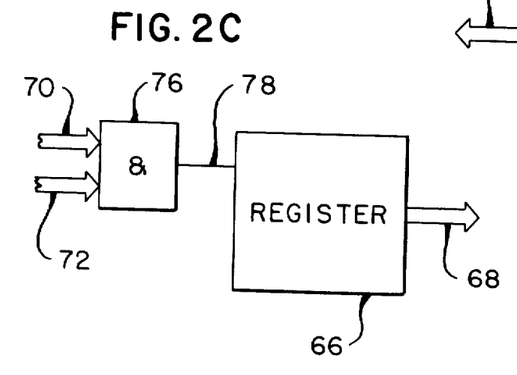

In FIG. 2C, there is illustrated a register 66 having a single output bus 68 on the right-hand side of the register and two input buses 70 and 72 on the left-hand side of the registers. The register and bus configuration shown in FIG. 2C is of the type that could be found in the mask 32 of the processor 12 (FIG. 1). Since the mask 32 has as its purpose the insertion of logical "0's" in selected bits of binary data operands, the data carried on bus 70 could be the data or operand to be masked, and the data on bus 72 could be the masking word which includes logical "0's" in the digits corresponding to the digits of the operand that are to be masked. The data on buses 70 and 72 is logically combined by an AND gate 76 such that the resulting data reaching the register 66 on the output 78 of the AND gate is properly masked.

Figure 2D:
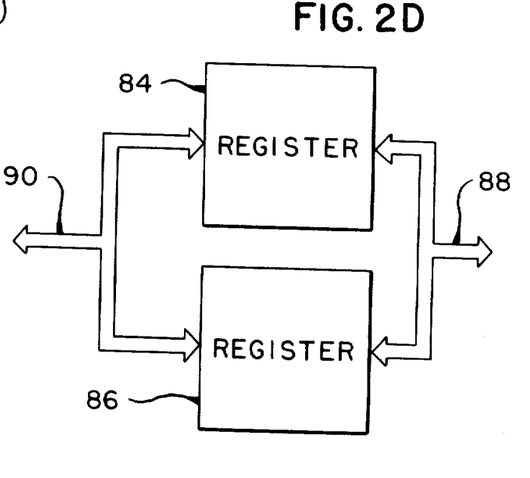

In FIG. 2D, two registers 84 and 86 are illustrated. A bi-directional data bus 88 on the right-hand side of the registers can transfer data into or out of the registers and likewise, a bi-directional data bus 90 on the left hand side of the registers can transfer data into or out of the registers. The register and bus configuration of FIG. 2D is of a type that might be found in the bus interface 40 (FIG. 1). Bus 88 could be connected to or form part of system bus 34 and bus 90 could be connected to or form part of system bus 14. During normal computer operation, data is being transferred between system buses 14 and 34 in either direction, and the diagram shown in FIG. 2D illustrates that data on bus 88 travelling toward the left could be stored in the upper register 84 as data on bus 90 travelling toward the right could be stored in lower register 86. Upon receipt of the proper enabling signals, the data in each of the registers 84 and 86 could continue its respective leftward and rightward movement, thereby bypassing the data being transferred through the other register in the opposite direction.

As mentioned above, the four illustrated register and bus configurations in FIGS. 2A, 2B, 2C and 2D are only examples. There would in fact be many other devices in a computer system which use registers, and which would have register and bus configurations other than those illustrated.

Figure 3:
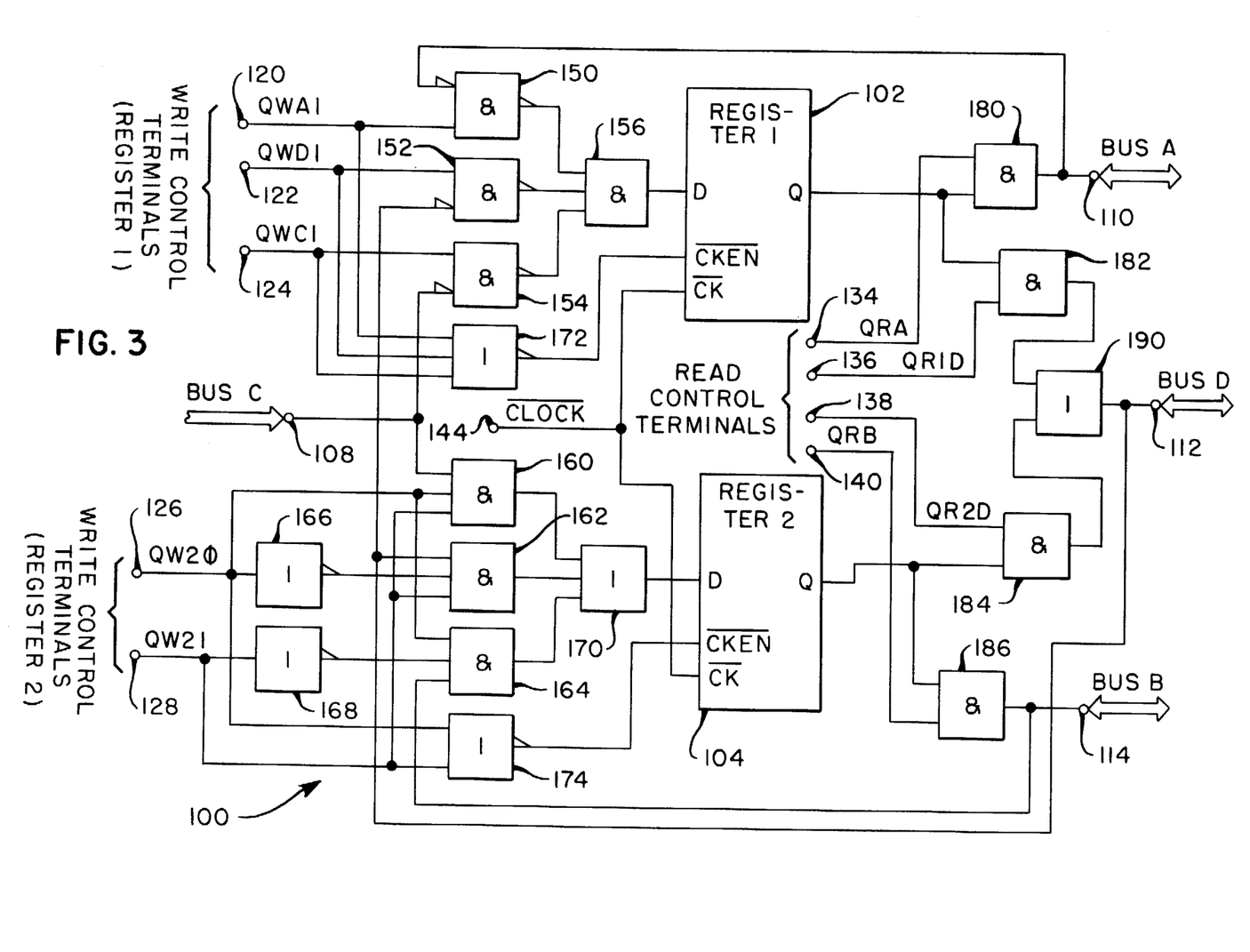
FIG. 3 is a block diagram of a register circuit in accordance with the present invention.

FIG. 3 illustrates one embodiment of a register circuit in accordance with the present invention which could be fabricated on an integrated circuit chip and which could selectively connect data buses in any of the configurations shown in FIGS. 2A through 2D. The register circuit 100 includes two 8-bit registers 102 and 104. The two registers 102 and 104 are connected by means of logic circuitry, to be described later, to four data bus terminals or pins 108, 110, 112 and 114, which in turn permit the connection of the register circuit to four external data buses which are designated in FIG. 3 as data buses C, A, D and B, respectively. Although not illustrated, it should be apparent that these data buses as well as the lines which connect the buses to the registers 102 and 104, are actually comprised of eight parallel data lines each, since each of the registers 102 and 104 receives, stores, or transfers an eight bit data word at a time.

In addition to the terminal or pin connections of the four data buses, there are nine pins or terminals for connecting the register circuit 100 to appropriate circuitry for receiving either write or read control signals. Three write control terminals 120, 122 and 124 receive signals QWA1, QWD1 and QWC1 to control the writing of data into register 102 (Register 1). Such data, as will be more fully described later, can be written into register 102 from one or more of the buses A, C, or D. Two write control terminals 126 and 128 are responsible for transferring coded control signals QW20 and QW21 for connecting register 104 (Register 2) to one of the data buses B, C, or D. The use of the term "coded" in connection with write control terminals 126 and 128 refers to the fact that, in contrast to the receipt of an enabling logic "1" signal on one of the control terminals 120, 122 and 124 to write data from one of three buses, terminals 126 and 128 must receive a properly coded combination of "0's" and "1's" on both terminals in order to write data from the one bus identified by that combination. As was mentioned earlier, the register circuit 100 is designed for construction as a monolithic integrated circuit. As is presently conventional, a monolithic integrated circuit usable, for example, in the devices shown in the computer system of FIG. 1, must have a maximum of 52 terminals or pins. Accordingly, in the design of each circuit 100, the requirement that the number of pins not exceed 52 requires that the write control terminal pins for register 104 be limited to two, and thus be encoded as described above to operatively connect three buses to the register. It should be appreciated, however, that absent constraints as to pin number, the write controls for register 104 could be three in number, as is the case with register 102.

The register circuit 100 further includes four read control terminals 134, 136, 138 and 140. The read control terminal 134 receives a control signal QRA for causing data to be read out of register 102 at bus terminal 110 and onto bus A. Read control terminal 136 receives a control signal QR1D for causing data to be read from register 102 at terminal 112 and onto bus D. Read control terminals 138 and 140 receive control signals QR2D and QRB to cause data to be read from register 104 at terminals 112 and 114 onto buses D and B, respectively.

The remaining illustrated terminal on circuit 100 is the clock terminal 144 which receives clock pulses from appropriate external circuitry and applies the clock pulses to the inverted clock input ($\overline{CK}$) of both registers 102 and 104.

FIG. 3 also illustrates the logic circuitry required to select one or more of the data buses A, B, C and D for connection to the data input "D" of registers 102 and 104. The logic circuitry also controls, in conjunction with appropriate control signals on the read control terminals, which of the three bi-directional data buses A, B and D will be connected to the data output "Q" of the registers 102 and 104.

Such logic circuitry includes three NAND gates 150, 152, and 154 having one input connected to the terminals 110, 112, and 108, respectively, associated with data buses A, D and C. The other inputs to the NAND gates 150, 152 and 154 are connected to the write control terminals 120, 122, and 124, respectively. The outputs of the NAND gates 150, 152, and 154 are each connected to one of three inputs of an AND gate 156, whose output is connected to the "D" input of register 102. When one of the write control terminals 120, 122, or 124 receives a control signal having a logic "1" value, the bus associated with such terminal is gated to the "D" input of register 102. If two control terminals are enabled, the data on the two buses is first combined by AND gate 156 and then written into register 102 at the "D" input.

In a similar fashion, three AND gates 160, 162, and 164 each have one input connected to the terminals 108, 112, and 114, respectively, associated with data buses B, C and D. The remaining two inputs of AND gate 160 are connected to the write control terminals 126 and 128. The other two inputs of AND gate 162 are connected to the write control terminal 126 by way of an inverter 166 and to the write control terminal 128. The other two inputs of AND gate 164 are connected to write control terminal 128 by way of an inverter 168 and to the write control terminal 126.

The output of AND gates 160, 162 and 164 are connected to the "D" input of register 104 by way of an OR gate 170. When appropriate control signals are received on terminals 126 and 128, one of the buses will be connected to the "D" input of register 104. For example, if terminal 126 receives a logic "0" signal and terminal 128 a logic "1" signal, Bus D is connected, thru AND gate 162 and OR gate 170, to register 104.

The three write control terminals 120, 122 and 124 are connected to the three inputs of an OR gate 172, whose output is connected to the inverted clock enable ($\overline{CKEN}$) input of register 102. Thus, register 102 is enabled only if one of its write control terminals is at a logic "1" level. The write control terminals 126 and 128 are connected to the two inputs of a NOR gate 174, whose output is connected to the inverted clock enable input of register 104. Register 104 is enabled to receive data only if at least one of its write terminals is at a "1" logic level.

The data outputs "Q" of registers 102 and 104 are connected to the data bus terminals 110, 112 and 114 by four AND gates 180, 182, 184 and 186. The output of register 102 is connected to inputs of the gates 180 and 182 and the output of register 104 is connected to inputs of the gates 184 and 186. The other inputs to gates 180, 182, 184 and 186 are connected to the read control terminals 134, 136, 138 and 140, respectively. The outputs of gates 180 and 186 are connected directly to the data bus terminals 110 and 114, and the outputs of gates 182 and 184 are both connected to the data bus terminal 112 by way of an OR gate 190.

As should be apparent, by appropriate selection of enabling control signals for write control terminals 120, 122, 124, 126 and 128, and for read control terminals 134, 136, 138 and 140, the register circuit 100 can be connected to the data buses A, B, C or D to form any one of the configurations illustrated in FIGS. 2A, 2B, 2C or 2D. For example, if the circuit 100 is to be configured like the register shown in FIG. 2A and used, for example, in the Instruction Register 30 of FIG. 1, write control terminals 120, 126, and 128, and read control terminals 136 and 140 would receive enabling control signals having a "1" logical level. Data buses A and C would thereby serve as a 16-bit input bus into the registers 102 and 104, and buses B and D would serve as a 16-bit output bus.

As a further example, if register circuit 100 is to be configured in the same fashion as the register shown in FIG. 2B and used, for example, in the I/O device 16 of FIG. 1, logic level "1" control signals on write control terminal 120 and on read control terminal 134 will cause the A bus to act as bi-directional bus 60 of FIG. 2B; logic level "1" control signals on write control terminals 122 and 128, and on read control terminals 136 and 138 will cause the D bus to act as bi-directional bus 58 of FIG. 2B; logic level "1" control signals on write control terminals 124, 126 and 128 will cause the C Bus to act as bus 64 of FIG. 2B; and logic level "1" control signals on write control terminals 126 and on read control terminal 140 will cause the B bus to act as bi-directional bus 62 of FIG. 2B.

It should, of course, be apparent that the register and bus configurations of FIGS. 2C and 2D, as well as many other possible register and bus configurations which might be used in a computer system, could be similarly produced by appropriate control signals at the read and write control terminals of register circuit 100.

Figure 4:
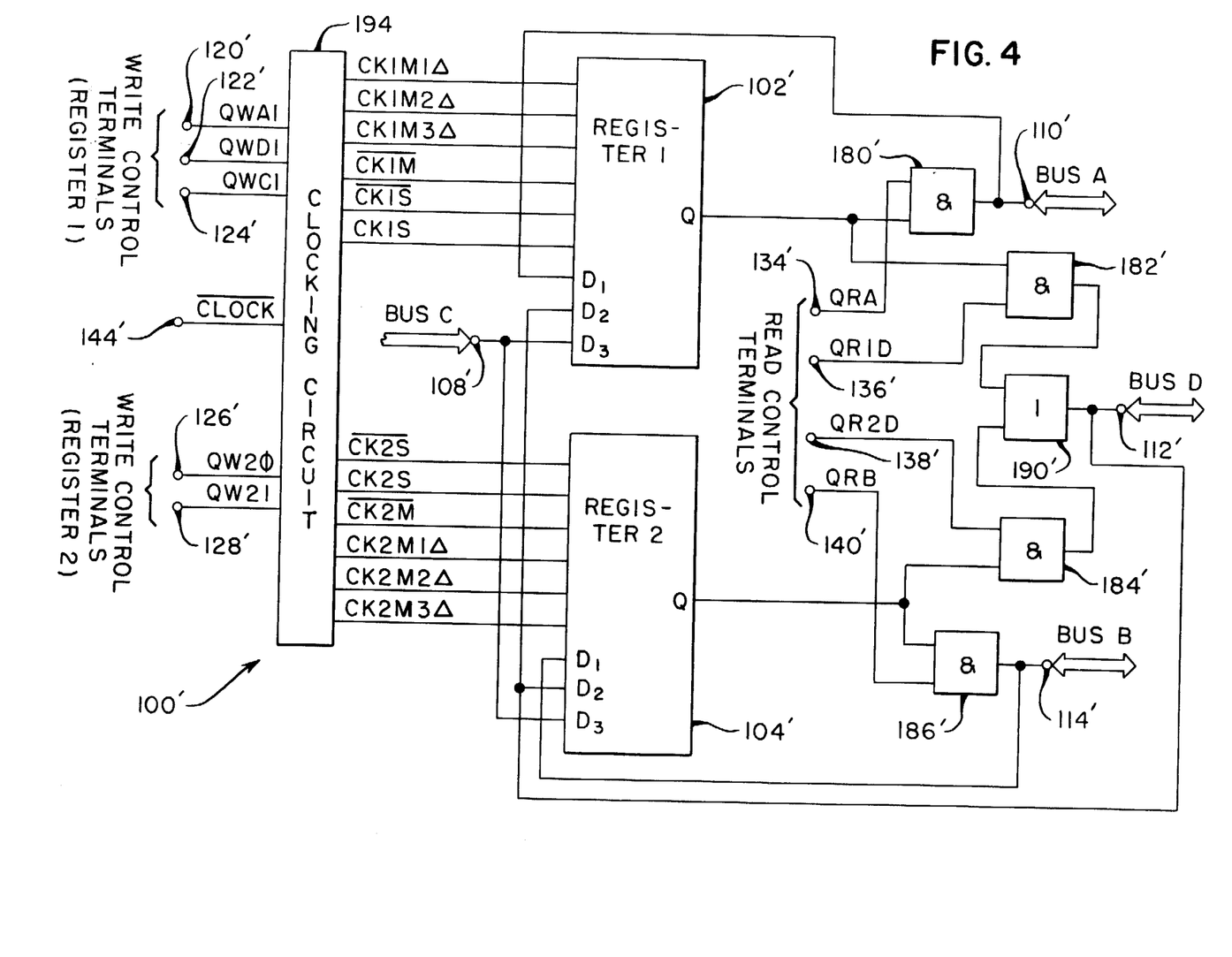
FIG. 4 is a block diagram of an alternative form of a register circuit in accordance with the present invention.

As mentioned earlier, the register circuit can be manufactured conveniently in the form of an integrated circuit. In the practice of the present invention, it has been found particularly convenient to produce the register circuit on an LSI (large scale integration) one hundred and sixty-eight gate array using emitter coupled logic (ECL). In the design of the register circuit on such an LSI gate array, it was found convenient, in order to efficiently and effectively use the gates on the array, to provide an alternate design for the register circuit. Such a circuit and its operation are illustrated in FIGS. 4, 5, 6 and 7, and is generally designated by the reference number 100'. As can be seen in FIG. 4, much of the register circuit 100' is identical to that shown in FIG. 3. Those components which are analogous to and perform the same function as components in FIG. 3 are given the same reference number, with the addition of a prime (').

It should be noted that the register circuit 100' illustrated in FIG. 4, as viewed at its data and control terminals, is logically equivalent to the register circuit 100 shown in FIG. 3.

As is common in circuits using emitter coupled logic, many of the input signals to the gates in the register circuit 100' are inverted and normally at a logic "1" level and become active by switching to the logic "0" level. Such signals are indicated by a line or "bar" over their identifying letters. Thus $\overline{CLOCK}$ indicates a logic "0" clock pulse. In addition, as signals progress through the gates of the logic circuit, they become delayed or "skewed". Such skewed signals include a delta ($\Delta$) following their identifying letters. Thus, CK1M1$\Delta$ indicates a clocking signal skewed or delayed through one gate from the $\overline{CK1M}$ signal.

As seen in FIG. 4, the register circuit 100' includes a clocking circuit 194 which has inputs for control signals QWA1, QWD1, QWC1, QW20 and QW21 from write control terminals 120', 122', 124', 126' and 128', respectively, and a $\overline{CLOCK}$ signal from clock terminal 144'. The clocking circuit 194 accomplishes the selective connection of the A, B, C and D buses to the registers 102' (Register 1) and 104' (Register 2). As will be described later with reference to FIG. 6, the registers 102' and 104' are each comprised of eight master-slave flip-flops, each flip-flop capable of storing one bit of data. Each of the registers 102' and 104' is illustrated with three data inputs $D_1$, $D_2$ and $D_3$. The $D_1$, $D_2$ and $D_3$ inputs of register 102' are connected to the bus terminals 110', 112', and 108', and thus the A, D and C buses, respectively. The $D_1$, $D_2$ and $D_3$ inputs of register 104' are connected to the bus terminals 114', 112' and 108', and thus the B, D and C buses, respectively. Register 102' also receives CK1M1$\Delta$, CK1M2$\Delta$, CK1M3$\Delta$, $\overline{CK1M}$, $\overline{CK1S}$ and CK1S clocking signals from the clocking circuit 194. Signals CK1M1$\Delta$, CK1M2$\Delta$ and CK1M3$\Delta$ determine which of the A, D and C buses ($D_1$, $D_2$ and $D_3$ inputs) will be written into Register 102'. The $\overline{CK1M}$ signal provides a clocking signal to the master latch of each flip-flop in Register 102', and the $\overline{CK1S}$ and CK1S signals provide clocking signals to the slave latch of each flip-flop in Register 102', such signals being independent of which bus is selected. Analogous signals CK2M1$\Delta$, CK2M2$\Delta$, CK2M3$\Delta$, $\overline{CK2M}$, $\overline{CK2S}$, and CK2S are provided to register 104' by the clocking circuit 194.

The connection of the buses A, B and D to the Q outputs in order to read data from registers 102' and 104' is accomplished in the same manner as described earlier with reference to the register circuit 100 in FIG. 3. Accordingly, an explanation of the read control terminals 134', 136', 138', 140' and the AND gates 180', 182', 184' and 186' can be obtained by referring to the earlier discussion of the corresponding reference numbers in FIG. 3.

Figure 5:
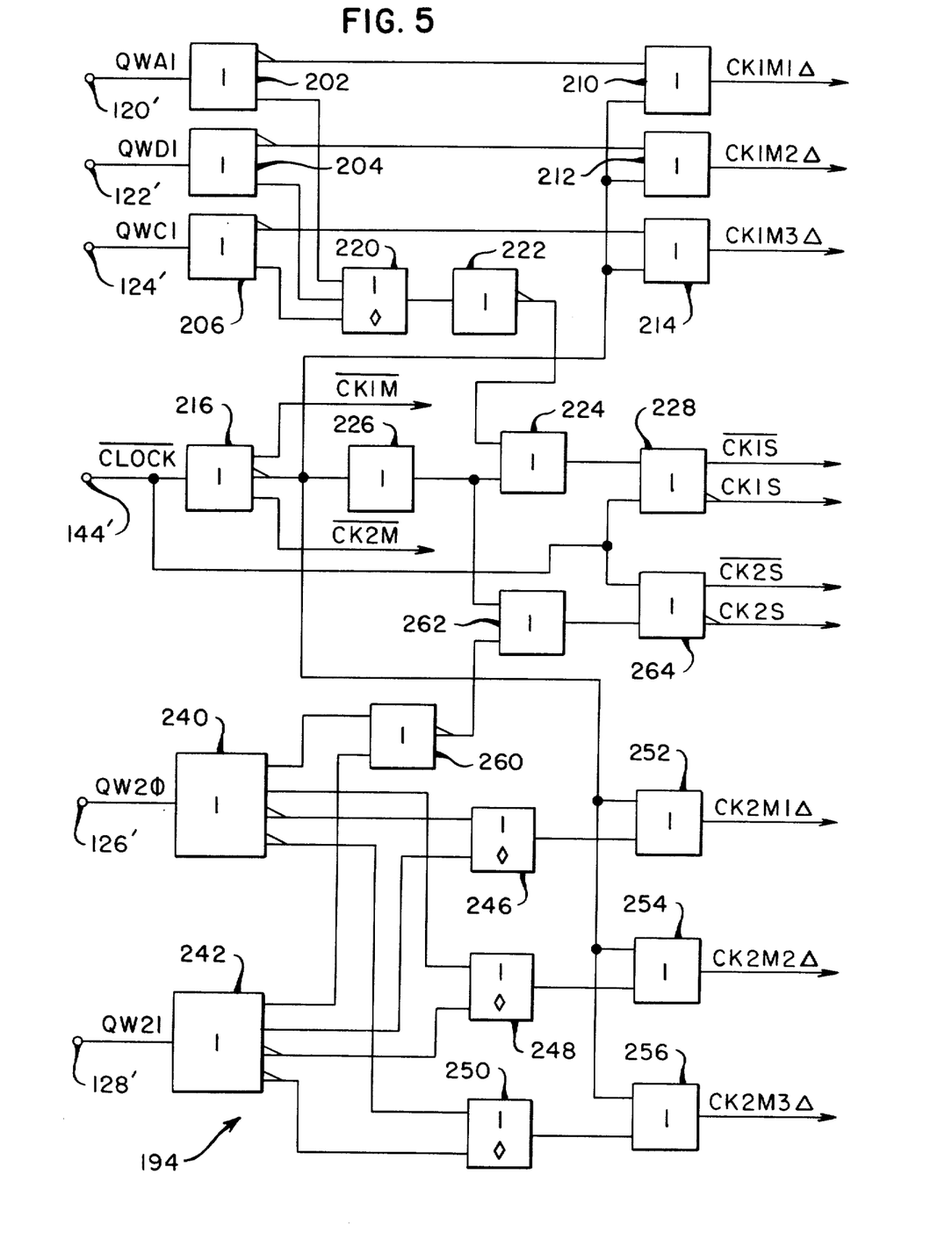
FIG. 5 is a block diagram showing a clocking circuit for use in the register circuit of FIG. 4.

The logic circuitry in clocking circuit 194 is illustrated in FIG. 5. The write control terminals 120', 122' and 124' are connected to the single input of OR gates 202, 204 and 206, respectively. The inverted outputs of OR gates 202, 204 and 206 are connected to one input of three OR gates 210, 212 and 214. The other input of OR gates 210, 212 and 214 is from the clock terminal 144' by way of the inverted output of an OR gate 216. The outputs of OR gates 210, 212 and 214 provide the CK1M1$\Delta$, CK1M2$\Delta$ and CK1M3$\Delta$ signals to register 102'.

The non-inverted outputs of gates 202, 204 and 206 are connected to the three inputs of a wired OR gate 220, whose output is inverted by an NOR gate 222 and is then connected to one input of an OR gate 224. The other input of OR gate 224 is connected to the inverted output of OR gate 216 by way of an OR gate 226. The output of gate 224 is connected to one input of an OR gate 228. The other input of gate 228 is connected to the clock terminal 144'. The non-inverted and inverted outputs of OR gate 228 are the $\overline{CK1S}$ and CK1S signals, respectively. A non-inverted output of OR gate 216 provides the $\overline{CK1M}$ signal.

The discussion of the clocking circuit 194 has thus far been directed to the clocking signals generated for register 102'. For the clocking signals generated for register 104', reference can be made to the write control terminals 126' and 128', each of which are connected to a single input of OR gates 240 and 242. The two inverted and one of the non-inverted outputs of each of OR gates 240 and 242 are connected to the inputs of three wired OR gates 246, 248 and 250. The outputs of OR gates 246, 248 and 250 are each connected to one input of OR gates 252, 254 and 256. The other inputs of gates of 252, 254 and 256 are connected to the inverted output of previously mentioned OR gate 216. The outputs of OR gates 252, 254 and 256 provide the CK2M1$\Delta$, CK2M2$\Delta$ and CK2M3$\Delta$ signals to register 104'.

A fourth, non-inverted output of each of gates 240 and 242 is connected to the input of a NOR gate 260, which has its output connected to one input of an OR gate 262. The other input of gate 262 is connected to the output of previously mentioned OR gate 226. The output of gate 262 and the clock terminal 144' are each connected to an input of an OR gate 264, whose outputs provide the $\overline{CK2S}$ and CK2S signals to Register 104'.

A third output of previously mentioned OR gate 216 provides the $\overline{CK2M}$ signal.

Figure 6:
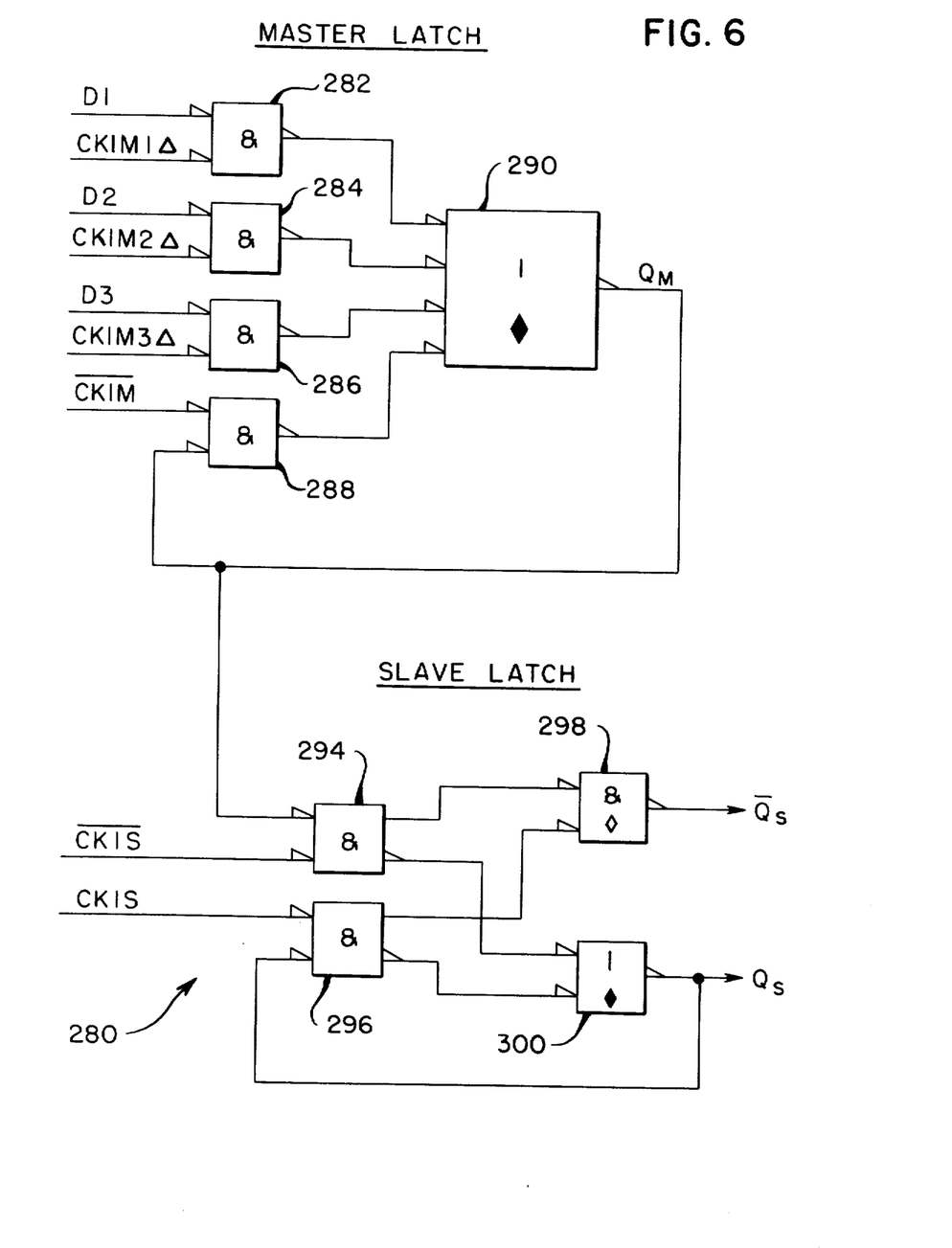
FIG. 6 is a block diagram illustrating the master-slave flip-flop used in each of the registers of the register circuit illustrated in FIG. 4.

FIG. 6 illustrates the logic diagram of a master-slave flip-flop 280. Registers 102' and 104' each have eight such flip-flops, one for each of the 8 bits of data to be stored in each of the registers. The master latch of the flip-flop is comprised of four NAND gates 282, 284, 286 and 288, and a wired NOR gate 290 which receives the outputs of the NAND gates 282, 284, 286 and 288 at its inverted inputs. The two inputs to each of the three NAND gates 282, 284 and 286 are one of the three data inputs $D_1$, $D_2$ and $D_3$ previously mentioned in reference to FIG. 4, and the corresponding one of the clocking signals CK1M1$\Delta$, CK1M2$\Delta$ and CK1M3$\Delta$. The fourth NAND gate 288 receives the $\overline{CK1M}$ clocking signal at one input and the output of NOR gate 290 at the other input.

The slave latch of flip-flop 280 includes two AND gates 294 and 296, a wired NAND gate 298 and a wired NOR gate 300. AND gate 294 receives the output of the master latch $Q_M$ from NOR gate 290 and receives the $\overline{CK1S}$ clocking signal. AND gate 296 receives the CK1S clocking signal and the $Q_S$ output from NOR gate 300. The output of NAND gate 298 is the inverted data output $\overline{Q_S}$ of the flip-flop.

It should be noted that the NOR gate 290 of the master latch provides, among other things, the "ANDing" function when data from plural data buses is entered into register 102', such function being provided by AND gate 156 of the register circuit 100 illustrated in FIG. 3. This "ANDing" function is "ignored" by each flip flop 280 in register 104', since write control terminals 126' and 128' for register 104' are coded and, at any given time, only one of the clocking signals CK2M1Δ, CK2M2Δ and CK2M3Δ can be enabled.

Figure 7:
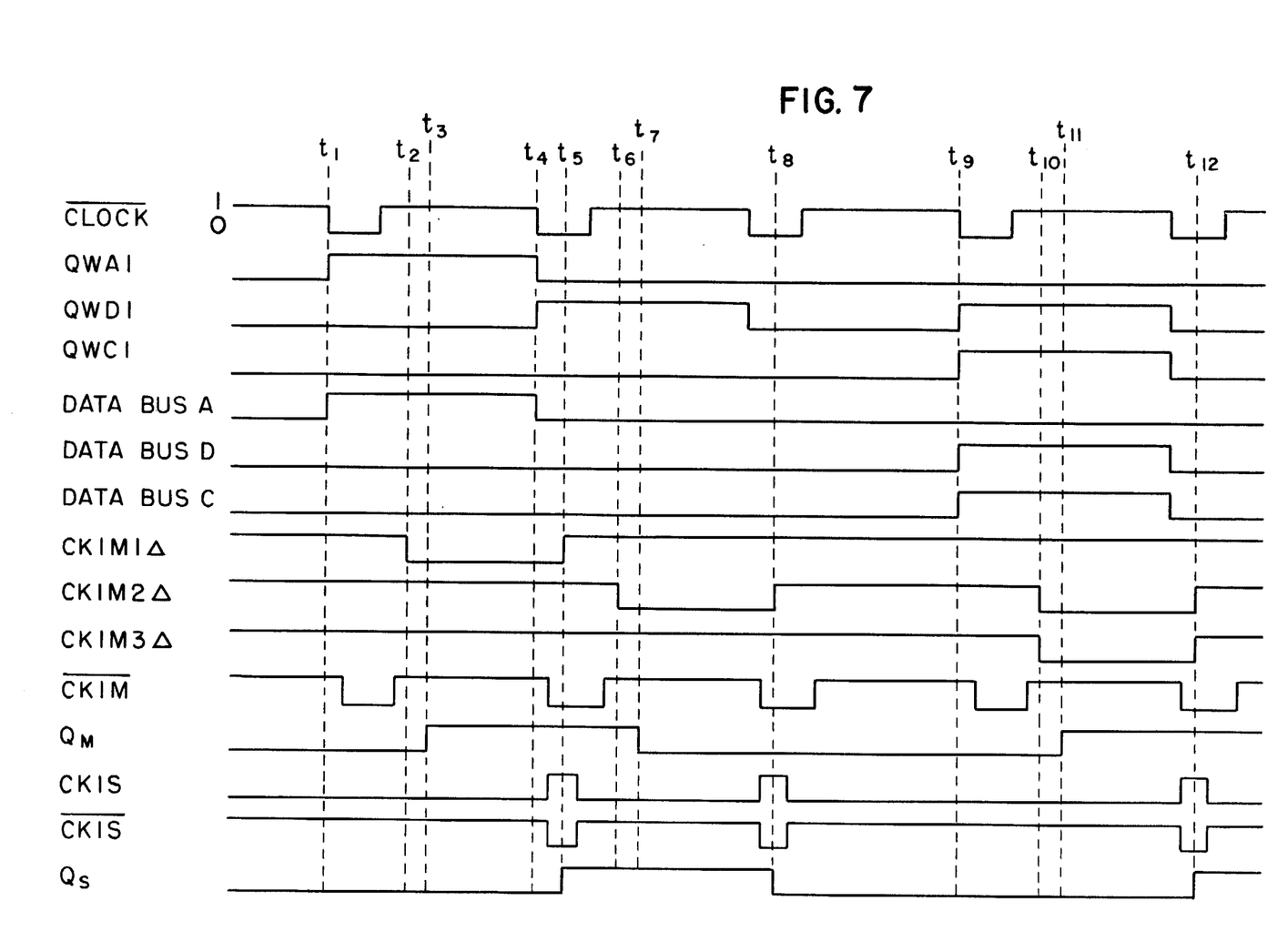
FIG. 7 is a timing diagram illustrating the operation of the register circuit of FIG. 4.

The operation of the register circuit 100', and in particular the clocking circuit 194 and flip flop 280 as used in register 102', is illustrated by the timing diagram of FIG. 7.

The $\overline{CLOCK}$ signal illustrated at the top of FIG. 7 is an inverted or negative going clock signal delivered from clock terminal 144' to the clocking circuit 194. It should be noted that because the $\overline{CLOCK}$ signal is inverted by gate 216 and supplied to the OR gates 210, 212 and 214 (FIG. 5), data can be read into the master latch of flip-flop 280 only when the $\overline{CLOCK}$ signal is at its upper or logic "1" level.

The first enabling control signal shown in FIG. 7 is QWA1, which at time $t_1$ goes to a "1" and, after $\overline{CLOCK}$ goes to a "1" and after a normal gate delay through gates 216 and 210, causes CK1M1Δ to go an enabling "0" at time $t_2$. At the same time QWA1 has gone to "1" (time $t_1$), data bus A has gone to "1", so that the data A bus and CK1M1Δ and the clocking signal $\overline{CK1M}$, cause the output of the master latch at gate 290 (FIG. 6), $Q_M$, to go to a "1" at $t_3$. At such time, the other clocking signals CK1M2Δ and CK1M3Δ that are inputs to the master latch (FIG. 6) are all at a "1" and have no effect on $Q_M$. During the time in which $Q_M$ goes to a "1", the enabling QWA1 signal travels from OR gate 202 through gates 220, 222, 224 and 228 (FIG. 5), and causes CK1S to go from "0" to "1", and $\overline{CK1S}$ to go from "1" to "0". As a result, the "1" on data bus A is clocked into the slave latch (FIG. 6) from the master latch and $Q_S$ goes to a "1" at time $t_5$. This data will remain in the slave latch until another control signal is enabled and such signal progresses through the clocking circuit and the flip-flop to change the data signal at $Q_S$.

In the illustrated timing diagram, such an enabling signal does occur at $t_4$, when QWD1 changes to a "1". As a consequence, at time $t_6$, CK1M2Δ goes to an enabling "0". The data signal on data bus D, a "0", is clocked into the master latch and appears at $Q_M$ at $t_7$, and after CK1S and $\overline{CK1S}$ change state, is clocked into the slave latch and appears at $Q_S$ at time $t_8$. This data signal remains at $Q_S$ until another enabling write control signal is received, which occurs at $t_9$ when QWD1 and QWC1 both go to "1". The data to be read into the flip-flop is on data buses D and C, and both are at a "1". Both CK1M2Δ and CK1M3Δ go to an enabling "0" at $t_{10}$ and the data on buses D and C is clocked into the master latch. The data from buses D and C are, in effect, "ANDed" by gate 290 and a "1" appears at $Q_M$ at $t_{11}$. After CK1S goes to "1" and $\overline{CK1S}$ goes to "0", the "1" at $Q_M$ is clocked into the slave latch and at time $t_{12}$, $Q_S$ goes to "1".

The storage of data in the flip-flops of register 104' occurs in much the same manner. However, as noted earlier in connection with FIG. 3, since the write controls are encoded, a proper combination of "0's" and "1'" would need to be present as control signals QW20 and QW21 in order to cause one of the clocking signals CK2M1Δ, CK2M2Δ or CK2M3Δ to become enabling.

As an example, suppose it were desired to cause CK2M1Δ to be enabled ("0" logic level) so that data on bus B would be clocked into the flip-flops in register 104'. Referring to FIG. 5, the proper code on write control terminals 126' and 128' for such a condition would be for QW20 to go to a "1", and for QW21 to go to a "0". The inputs to OR gates 246 would both go to "0" and CK2M1Δ would go to an enabling "0" when $\overline{CLOCK}$ goes to a "1". The OR gates 248 and 250 have a "1's" at at least one of their inputs and thus CK2M2Δ and CK2M3Δ would both go to "1". The data is clocked into the flip-flops in register 104' in the same manner as described above with reference to register 102', except that the clocking signals CK2M1Δ, CK2M2Δ, $\overline{CK2M}$, $\overline{CK2S}$ and CK2S latch the data into the flip-flop rather than the corresponding signals CK1M1Δ, CK1M2Δ, CK1M3Δ, $\overline{CK1M}$, $\overline{CK1S}$ and CK1S associated with register 102'.

Although the presently preferred embodiments of the invention have been described, it should be understood that within the purview of the invention various changes may be made within the scope of the appended claims.

What is claimed is:

1. In a data processing system, a register circuit in the form of an integrated circuit structure for use at each of a plurality of locations in order to reduce the number of different types of integrated circuits in the data processing system, wherein at each location there are external data buses, including
    (a) at least one external data bus for transferring data into the register circuit, and
    (b) at least one external data bus for transferring data out of the register circuit,
and wherein at each location there is a different number of at least one of
    (a) the external data buses for transferring data into the register circuits and
    (b) the external data buses for transferring data out of the register circuits,
the register circuit comprising:
    (A) at least two multibit registers, each of said two registers for storing a data word or the like and having a data input and a data output;
    (B) a plurality of data terminals on the integrated circuit structure for connection to the external data buses, including first and second bi-directional data input/output terminals, each of the first and second bi-directional terminals for connection to an external bi-directional data bus; and
    (C) logic means for receiving external control signals and in response selectively connecting said plurality of data terminals to the data inputs and data outputs of said two registers, including means for connecting the first bi-directional data terminal to either one of the data input and data output of both said two registers and connecting the second bi-directional data terminal to either one of the data input and data output of at least one of said two registers, so that the register circuit selectively connects a different number of at least one of
        (a) the external data buses for transferring data into the register circuits, and (b) the external data buses for transferring data out of the register circuits, to the data inputs and data outputs of said two registers at each of the plurality of locations in the data processing system.

2. The register circuit of claim 1, wherein said logic means includes input AND gate means having a gate output connected to the data input of at least one of said two registers and having a first gate input connected to at least one of said data terminals and a second gate input for receiving one of the control signals and in response operatively connecting that one of said data terminals to the data input of that one of said two registers through said input AND gate means.

3. The register circuit of claim 1, wherein said logic means includes output AND gate means having a first gate input connected to the output of at least one of said two registers, and having a gate output connected to at least one of said data terminals and a second gate input for receiving one of the control signals and in response operatively connecting the data output of that one of said two registers to that one of said data terminals through said output AND gate means.

4. The register circuit of claim 1, wherein said logic means operatively connects two data terminals to the data inputs of at least one of said two registers and further includes means for logically combining the data from said two data terminals prior to being stored in that one of said two registers.

5. The register circuit of claim 1, wherein the data input and data output of said two registers each include plural data lines, wherein said logic means includes plural logic gates, with at least one of said logic gates associated with each of said data lines.

6. The register circuit of claim 1 wherein said data terminals include plural parallel data input-only terminals, wherein said data terminals further include plural bi-directional parallel data input-output terminals associated with each of the first and second bi-directional terminals, and wherein said logic means includes plural AND gate means, each AND gate means having a first input connected to a different one of said plural bi-directional parallel data input-output terminals and said plural parallel data input-only terminals and a second input connected to receive a different one of the control signals, each AND gate means further including an output connected to the data input of one of said two registers.

7. The circuit of claim 1, wherein said logic means includes a clocking circuit for receiving write control signals and a clock signal, and for delivering clocking signals to said two registers for operatively connecting selected ones of said data terminals to the data input of said two registers in response to the write control signals.

8. A method for reducing the number of different types of integrated circuits used in data processing systems, which comprises the step of:
using a register circuit at any one of a plurality of locations in the data processing system, wherein at each location there are external buses, including:
(a) at least one external bus for transferring data into the register circuit, and
(b) at least one external bus for transferring data out of the register circuit,
wherein at each location there is a different number of at least one of:
(a) the external data buses for transferring data into the register circuits, and
(b) the external data buses for transferring data out of the register circuits,
and wherein the register circuit has the form of an integrated circuit structure and comprises:
(A) at least two registers, each of said two registers for storing a data word or the like and having a data input and a data output;
(B) a plurality of data terminals on the integrated circuit structure for connection to the external data buses, including first and second bidirectional data input-output terminals, each of the first and second bidirectional terminals for connection to an external bidirectional data bus; and
(C) logic means for receiving external control signals and in response selectively connecting said data terminals to the data inputs and data outputs of said two registers, including means for connecting the first bidirectional data terminal to either one of the data input and data output of both said two registers and the second bidirectional data terminal to either one of the data input and data output of at least one of said two registers, whereby the register circuit at each location is a single type of integrated circuit and transfers data between the external buses in one of a number of selectable configurations.

* * * * *